United States Patent
Laricchiuta et al.

(10) Patent No.: US 10,563,516 B2
(45) Date of Patent: Feb. 18, 2020

(54) TURBINE ENGINE AND METHOD OF ASSEMBLING

(71) Applicant: General Electric Company, Schenectady, NY (US)

(72) Inventors: Mark John Laricchiuta, WestChester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 784 days.

(21) Appl. No.: 15/202,976

(22) Filed: Jul. 6, 2016

(65) Prior Publication Data

US 2018/0010463 A1    Jan. 11, 2018

(51) Int. Cl.
| | |
|---|---|
| F01D 5/14 | (2006.01) |
| F04D 29/38 | (2006.01) |
| F04D 29/32 | (2006.01) |
| F01D 5/02 | (2006.01) |
| F01D 5/34 | (2006.01) |
| F02K 3/062 | (2006.01) |
| F02K 3/077 | (2006.01) |
| B33Y 80/00 | (2015.01) |

(52) U.S. Cl.
CPC ............. *F01D 5/147* (2013.01); *B33Y 80/00* (2014.12); *F01D 5/02* (2013.01); *F01D 5/146* (2013.01); *F01D 5/34* (2013.01); *F02K 3/062* (2013.01); *F02K 3/077* (2013.01); *F04D 29/326* (2013.01); *F04D 29/388* (2013.01); *F05D 2220/32* (2013.01); *F05D 2230/53* (2013.01); *F05D 2230/60* (2013.01); *F05D 2240/24* (2013.01); *Y02T 50/673* (2013.01)

(58) Field of Classification Search
CPC ....... F01D 5/147; F04D 29/326; F04D 29/388
See application file for complete search history.

(56) References Cited

U.S. PATENT DOCUMENTS

| | | | |
|---|---|---|---|
| 3,262,635 A * | 7/1966 | Smuland | F01D 11/02 |
| | | | 277/414 |
| 3,302,924 A * | 2/1967 | Castle | F01D 5/022 |
| | | | 416/193 R |
| 3,348,379 A | 10/1967 | Wilde et al. | |
| 3,486,328 A | 12/1969 | Boudigues | |
| 3,625,008 A | 12/1971 | Hewson et al. | |
| 5,079,916 A | 1/1992 | Johnson | |

(Continued)

FOREIGN PATENT DOCUMENTS

| | | |
|---|---|---|
| FR | 2 972 769 A1 | 9/2012 |
| GB | 1330904 A | 9/1973 |

OTHER PUBLICATIONS

International Search Report and Written Opinion issued in connection with corresponding PCT Application No. PCT/US17/40145 dated Oct. 2, 2017.

*Primary Examiner* — Ninh H. Nguyen
(74) *Attorney, Agent, or Firm* — Dority & Manning, P.A.

(57) ABSTRACT

A turbine engine that includes a stationary assembly, and a rotor assembly configured to rotate relative to the stationary assembly. The rotor assembly includes a plurality of unitary turbine and fan blades. Each unitary turbine and fan blade includes a single turbine airfoil, a single fan airfoil positioned radially outward from the single turbine airfoil, and a midspan shroud segment defined between the single turbine airfoil and the single fan airfoil.

11 Claims, 6 Drawing Sheets

(56) References Cited

U.S. PATENT DOCUMENTS

| | | | |
|---|---|---|---|
| 5,562,419 A | 10/1996 | Crall et al. | |
| 5,988,980 A * | 11/1999 | Busbey | F01D 5/143 |
| | | | 415/78 |
| 6,071,077 A | 6/2000 | Rowlands | |
| 6,195,983 B1 | 3/2001 | Wadia et al. | |
| 6,209,311 B1 | 4/2001 | Itoh et al. | |
| 6,454,535 B1 * | 9/2002 | Goshorn | F01D 5/022 |
| | | | 416/193 R |
| 7,216,475 B2 | 5/2007 | Johnson et al. | |
| 7,578,655 B1 * | 8/2009 | Matheny | F01D 5/147 |
| | | | 416/190 |
| 7,758,303 B1 * | 7/2010 | Wadia | F01D 5/022 |
| | | | 415/77 |
| 8,127,528 B2 | 3/2012 | Roberge | |
| 8,667,775 B1 | 3/2014 | Kisska et al. | |
| 8,777,554 B2 | 7/2014 | Baughman | |
| 9,016,041 B2 | 4/2015 | Baughman et al. | |
| 2015/0369046 A1 * | 12/2015 | Roberge | F02C 3/04 |
| | | | 60/805 |
| 2016/0175983 A1 * | 6/2016 | Chivers | B22F 5/04 |
| | | | 29/889.23 |
| 2016/0222796 A1 * | 8/2016 | Spangler | F01D 5/186 |
| 2017/0314509 A1 | 11/2017 | Laricchiuta et al. | |

* cited by examiner

TURBINE ENGINE AND METHOD OF ASSEMBLING

BACKGROUND

The present disclosure relates generally to turbine engines and, more specifically, to unitarily formed turbine and fan blades for use in a turbine engine.

At least some known axial flow turbine engines include a rotor shaft and at least one turbine stage or at least one fan stage coupled to the rotor shaft. At least some known stages include a disk and circumferentially-spaced apart blades that extend radially outward from the disk. Each blade includes an airfoil and a dovetail at its root where the dovetail is radially retained in a complementary slot in a perimeter of the disk. Other known stages include the blades integrally manufactured with the disk as a one-piece component conventionally known as a blisk (i.e., bladed disk). The blisks are then coupled to the rotor shaft with a central tie bolt or a Hirth coupling, for example, to achieve torque transmission between the blisks and the rotor shaft, or between adjacent blisks. In at least some known turbine engine architectures, the turbine stages and fan stages are formed along the same axial plane of the turbine engine. As advancements in manufacturing techniques for turbine components continue to develop, there may be opportunities for improving engine performance in turbine engines that include integrated turbine and fan stages.

BRIEF DESCRIPTION

In one aspect, a turbine engine is provided. The turbine engine includes a stationary assembly, and a rotor assembly configured to rotate relative to the stationary assembly. The rotor assembly includes a plurality of unitary turbine and fan blades. Each unitary turbine and fan blade includes a single turbine airfoil, a single fan airfoil positioned radially outward from the single turbine airfoil, and a midspan shroud segment extending between the single turbine airfoil and the single fan airfoil.

In another aspect, a rotor assembly for use in a turbine engine is provided. The rotor assembly includes at least one unitary turbine and fan blade including a single turbine airfoil, a single fan airfoil, and a midspan shroud segment extending between the single turbine airfoil and the single fan airfoil.

In yet another aspect, a method of assembling a turbine engine is provided. The method includes coupling a plurality of unitary turbine and fan blades and a rotor disk together. Each unitary turbine and fan blade includes a single turbine airfoil, a single fan airfoil, and a midspan shroud segment defined between the single turbine airfoil and the single fan airfoil. The method also includes orienting the plurality of unitary turbine and fan blades such that the single fan airfoil is positioned radially outward from the single turbine airfoil.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to unitary turbine and fan blades for use in a turbine engine. More specifically, the unitary turbine and fan blades described herein include a single turbine airfoil and a single fan airfoil. The turbine and fan airfoils are formed as a single unitary structure, rather than formed separately and coupled together. As such, the fan airfoil is not required to carry its own centrifugal load during operation of the turbine engine, thereby reducing dead loading on the rotor assembly of the turbine engine. Moreover, the unitary turbine and fan blades each include a midspan shroud segment that, when aligned radially with each other, form a circumferential midspan shroud between turbine sections and fan sections of the turbine and fan blades. When considered as a whole, the design features and configuration of the unitary turbine and fan blades described herein provide improved aerodynamic and overall performance for a turbine engine.

Figure 1:
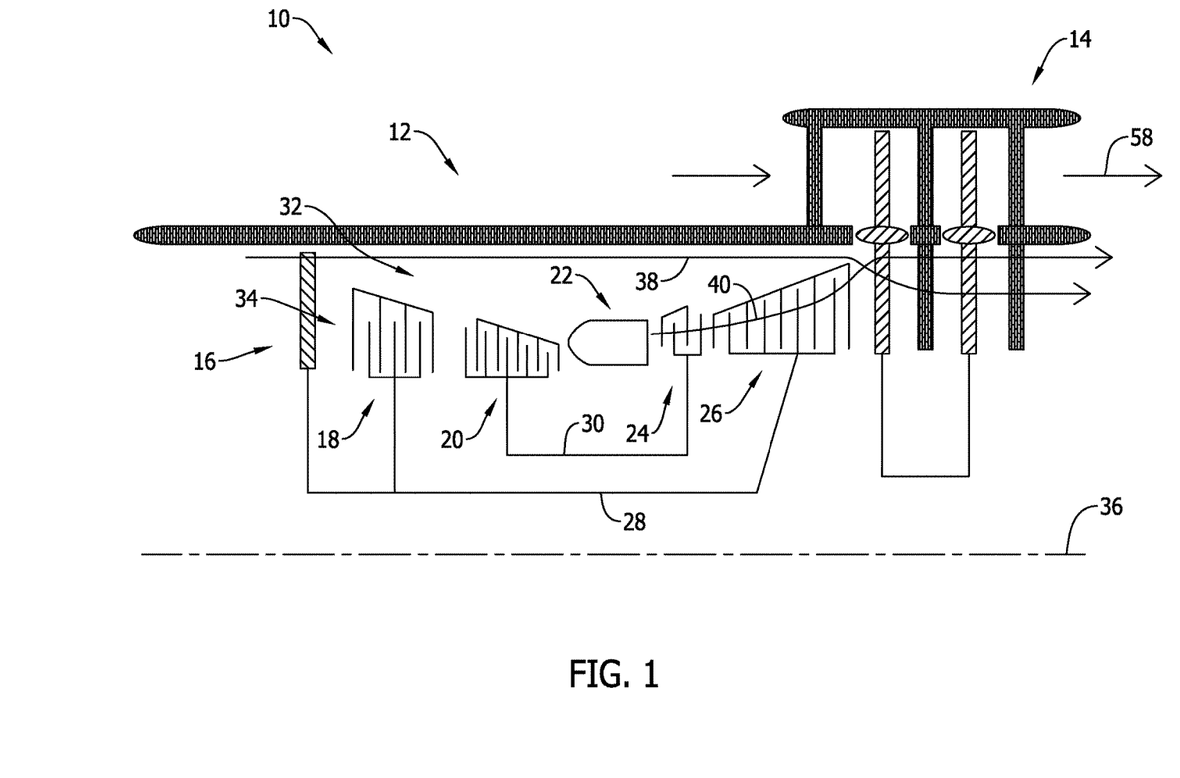
FIG. 1 is an illustration of an exemplary turbofan assembly.

FIG. 1 is a schematic illustration of an exemplary turbofan assembly 10 including a primary turbine section 12 and an aft fan section 14. Primary turbine section 12 includes a fan assembly 16, a low pressure or booster compressor assembly 18, a high-pressure compressor assembly 20, and a combustor assembly 22. Fan assembly 16, booster compressor assembly 18, high-pressure compressor assembly 20, and combustor assembly 22 are coupled in serial flow communication. Primary turbine section 12 also includes a high-pressure turbine 24 coupled in flow communication with combustor assembly 22 and a low-pressure turbine 26. Low-pressure turbine 26 is coupled to fan assembly 16 and booster compressor assembly 18 through a first drive shaft 28, and high-pressure turbine 24 is coupled to high-pressure compressor assembly 20 through a second drive shaft 30. Primary turbine section 12 also includes a bypass duct 32 and a main flow duct 34. Inlets of bypass duct 32 and main flow duct 34 are sized such that primary turbine section 12 has a bypass ratio of less than about 2 to 1. Primary turbine section 12 further includes a centerline 36 about which fan assembly 16, booster compressor assembly 18, high-pressure compressor assembly 20, and turbines 24 and 26 rotate. In an alternative embodiment, primary turbine section 12 has any bypass ratio that enables turbofan assembly to function as described herein.

In operation, air entering primary turbine section 12 is channeled through fan assembly 16. A first portion of the air channeled through fan assembly 16 is channeled through bypass duct 32, and a second portion of the air is channeled through main flow duct 34 and towards booster compressor assembly 18. Compressed air is discharged from booster compressor assembly 18 towards high-pressure compressor assembly 20. Highly compressed air is channeled from high-pressure compressor assembly 20 towards combustor assembly 22, mixed with fuel, and the mixture is combusted within combustor assembly 22. High temperature combustion gas generated by combustor assembly 22 is channeled towards turbines 24 and 26. Combustion exhaust gas is subsequently discharged from main flow duct 34 of primary turbine section 12, as will be explained in more detail below.

Figure 2:
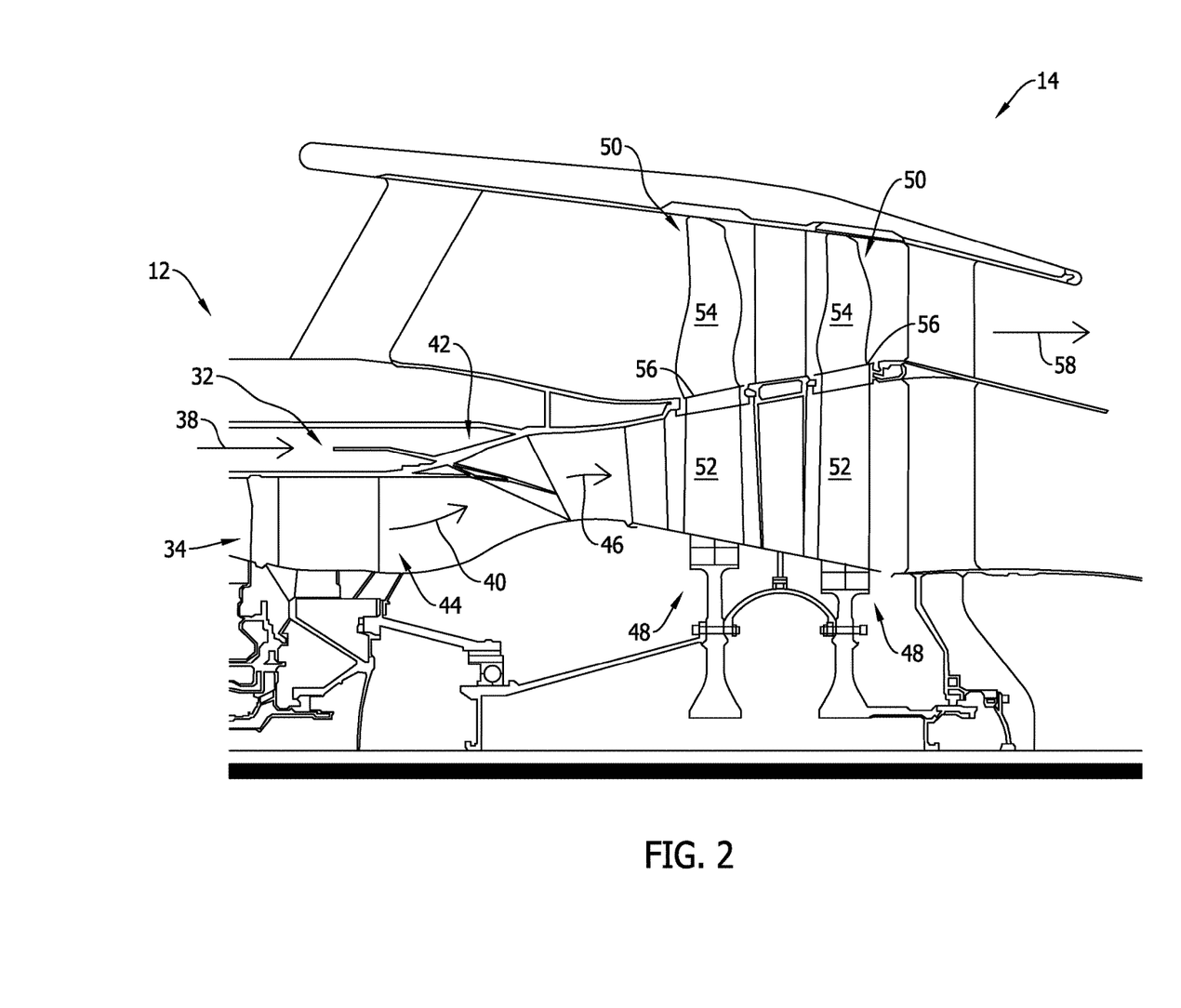
FIG. 2 is an enlarged schematic illustration of an exemplary aft fan section of the turbofan assembly shown in FIG. 1.

FIG. 2 is an enlarged schematic illustration of aft fan section 14. As described above, primary turbine section 12 includes bypass duct 32 and main flow duct 34. Bypass duct 32 channels a stream 38 of bypass air therethrough, and main flow duct 34 discharges a stream 40 of exhaust gas therefrom. In the exemplary embodiment, bypass duct 32 includes a discharge end 42, and main flow duct 34 includes a discharge end 44. Discharge ends 42 and 44 are positioned such that a mixed stream 46 of bypass air and exhaust gas is discharged from primary turbine section 12. More specifically, discharge end 42 is positioned such that stream 38 of bypass air, in its current form, is not exhausted from turbofan assembly 10.

In the exemplary embodiment, aft fan section 14 includes at least one turbine and fan blade 48 including a plurality of unitary turbine and fan blades 50. As will be described in more detail below, each unitary turbine and fan blade 50 includes a single turbine airfoil 52, a single fan airfoil 54, and a midspan shroud segment 56 defined between turbine airfoil 52 and fan airfoil 54. More specifically, turbine airfoil 52, and fan airfoil 54, and midspan shroud segment 56 are formed with each other as a single unitary structure. Turbine airfoil 52 is positioned to receive mixed stream 46 of bypass air and exhaust gas, and fan airfoil 54 is positioned radially outward from turbine airfoil 52. As such, turbine airfoil 52 drives turbine and fan blade 48, which enables fan airfoil 54 to discharge a stream 58 of propulsive air from aft fan section 14. While described in the context of an aft fan section, unitary turbine and fan blades 50 may be used in any turbine engine including turbine and fan blades aligned and defined along the same axial plane of the turbine engine.

Figure 3:
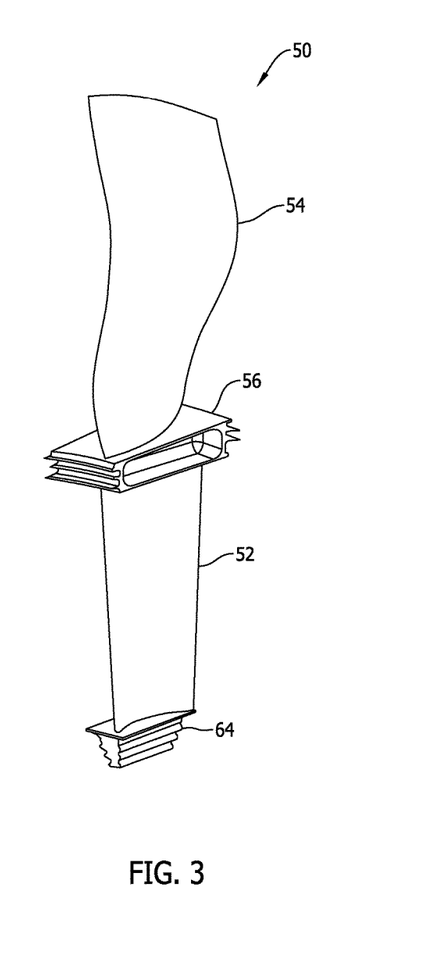
FIG. 3 is a perspective view illustration of an exemplary unitary turbine and fan blade that may be used in the aft fan section shown in FIG. 2.
Figure 4:
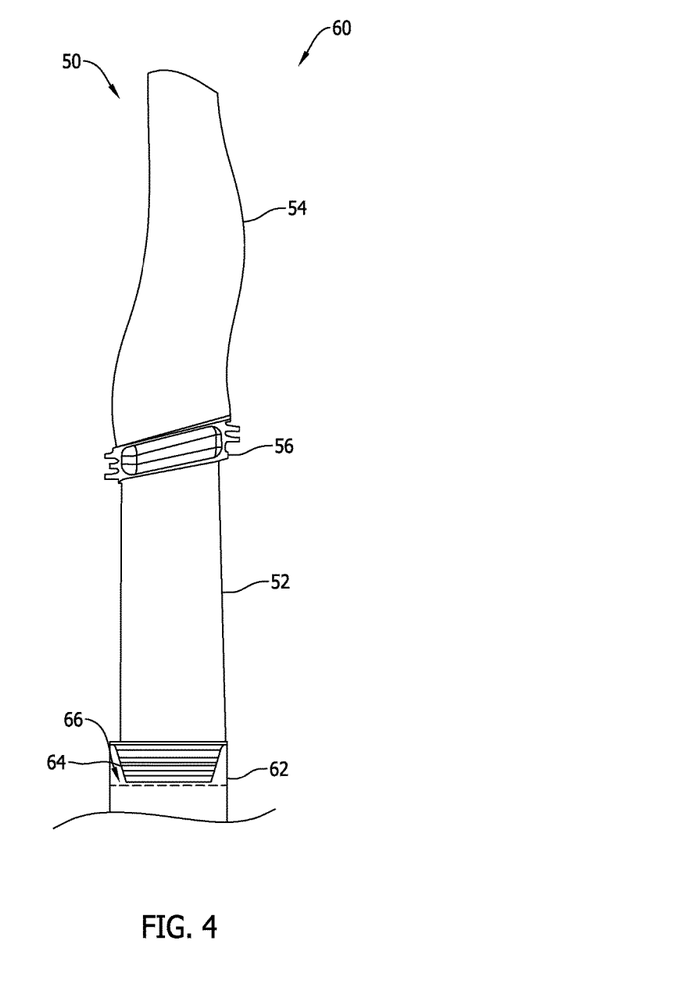
FIG. 4 is a side view illustration of an exemplary rotor assembly that may be used in the aft fan section shown in FIG. 2.

FIG. 3 is a perspective view illustration of unitary turbine and fan blade 50 that may be used in aft fan section 14 (shown in FIG. 2), and FIG. 4 is a side view illustration of an exemplary rotor assembly 60 that may be used in aft fan section 14. In the exemplary embodiment, rotor assembly 60 includes unitary turbine and fan blade 50 and a rotor disk 62 coupled together. More specifically, unitary turbine and fan blade 50 includes a root portion 64, and rotor disk 62 includes an axial slot 66 defined therein. Root portion 64 has a dovetail feature for engagement with rotor disk 62 at axial slot 66. Alternatively, unitary turbine and fan blade 50 is coupled to rotor disk 62 with the use of a circumferential slot or a pinned root connection.

As described above, turbine airfoil 52, fan airfoil 54, and midspan shroud segment 56 are formed with each other as a single unitary structure. For example, in one embodiment, unitary turbine and fan blade 50 is formed from a plurality of layers of material in an additive manufacturing process. As such, unitary turbine and fan blade 50 is fabricated from any material that enables rotor assembly 60 to function as described herein. In one embodiment, turbine airfoil 52 is fabricated from a first material and fan airfoil 54 is fabricated from a second material different from the first material. The first material is selected to ensure turbine airfoil 52 has strength and temperature resistance characteristics for receiving high-temperature exhaust gas, for example. Alternatively, the second material has lower temperature resistance characteristics than the first material. An exemplary first material includes, but is not limited to, a nickel-based material. An exemplary second material includes, but is not limited to, a titanium-based material.

Moreover, midspan shroud segment 56 is fabricated from a combination of the first material and the second material. In one embodiment, layers of the first material and the second material are interlayered within midspan shroud segment 56, and concentrations of the first material and the second material vary across midspan shroud segment 56. For example, a concentration of the first material in midspan shroud segment 56 is greater proximate to turbine airfoil 52, and a concentration of the second material in midspan shroud segment 56 is greater proximate to fan airfoil 54. As such, a material change within unitary turbine and fan blade 50 is progressively transitioned across midspan shroud segment 56 to reduce stress concentrations within unitary turbine and fan blade 50.

Figure 5:
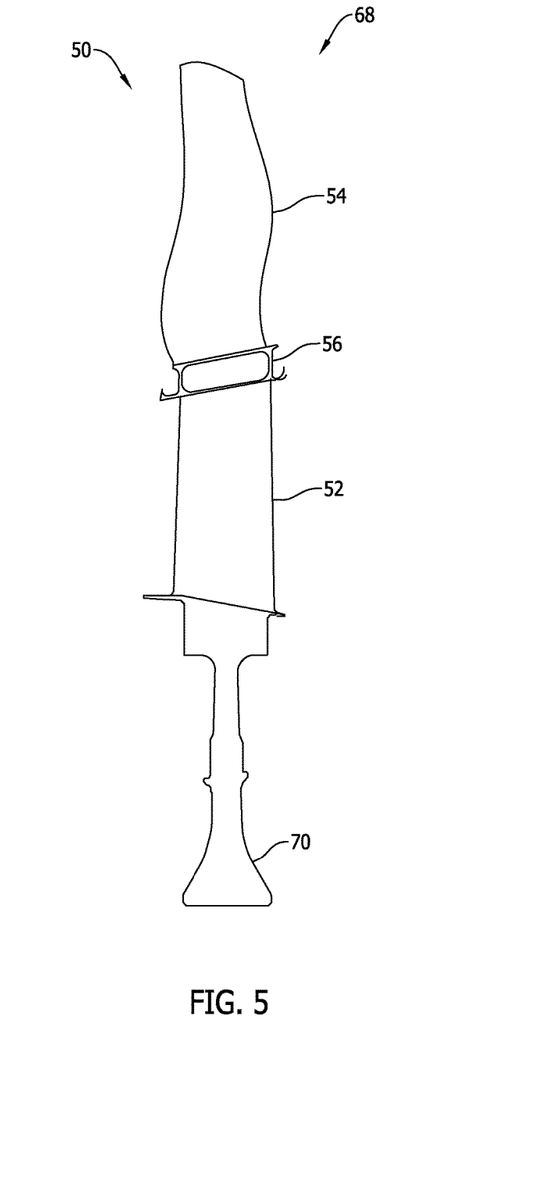
FIG. 5 is a side view illustration of an alternative rotor assembly that may be used in the aft fan section shown in FIG. 2.

FIG. 5 is a side view illustration of an alternative rotor assembly 68 that may be used in aft fan section 14 (shown in FIG. 2). In the exemplary embodiment, rotor assembly includes a rotor disk 70 formed with unitary turbine and fan blades 50 as a single unitary structure. As such, connection joints are eliminated between unitary turbine and fan blades 50 and rotor disk 70, thereby defining a blisk-type assembly.

Figure 6:
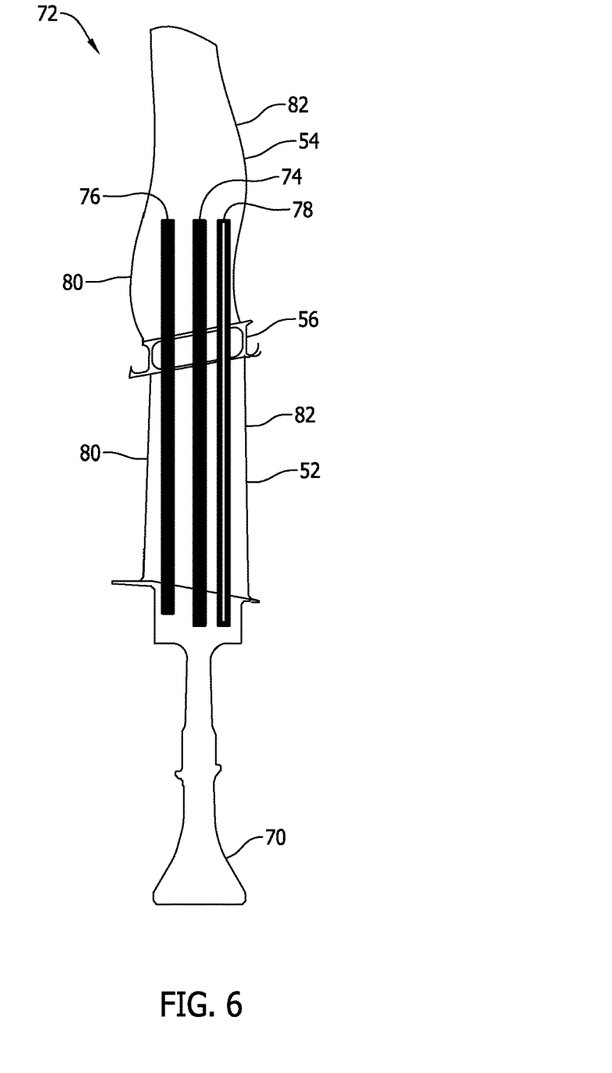
FIG. 6 is an internal illustration of an alternative unitary turbine and fan blade that may be used in the aft fan section shown in FIG. 2.

FIG. 6 is an internal illustration of an alternative unitary turbine and fan blade 72 that may be used in aft fan section 14 (shown in FIG. 2). In the exemplary embodiment, unitary turbine and fan blade 72 includes at least one reinforcing support member extending through turbine airfoil 52, across midspan shroud segment 56, and through fan airfoil 54. Reinforcing support members provide a localized stiffening force at predetermined locations along unitary turbine and fan blade 72. The reinforcing support members may be fabricated from any material that enables unitary turbine and fan blade 72 to function as described herein. Exemplary materials for forming the reinforcing support members include, but are not limited to, carbon fiber material and metal matrix fiber material.

As shown, unitary turbine and fan blade 72 includes a first reinforcing support member 74, a second reinforcing support member 76, and a third reinforcing support member 78. First reinforcing support member 74 extends longitudinally along thickest portions of turbine airfoil 52 and fan airfoil 54. Moreover, second reinforcing support member 76 extends along leading edges 80 of turbine airfoil 52 and fan airfoil 54, and third reinforcing support member 78 extend longitudinally along trailing edges 82 of turbine airfoil 52 and fan airfoil 54. In one embodiment, first reinforcing support member 74 is thicker than second reinforcing support member 76 and third reinforcing support member 78. First reinforcing support member 74 facilitates reducing an overall thickness of unitary turbine and fan blade 72, and second reinforcing support member 76 and third reinforcing support member 78 facilitate providing bending and overturning moment bend stiffness to unitary turbine and fan blade 72. As such, the reinforcing support members facilitate reducing an overall size of turbine and fan blade 72.

An exemplary technical effect of the systems and methods described herein includes at least one of: (a) providing a rotor assembly having a one-to-one ratio of turbine blades to fan blades in the same axial plane of a turbine engine; (b) improving acoustic performance of a turbine engine such that additional noise attenuation is provided for an aircraft in which the engine is attached; and (c) reducing an overall weight of a rotor assembly of the turbine engine.

Exemplary embodiments of a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan assemblies and related methods as described herein. Rather, the exemplary embodiment can be implemented and utilized in connection with many applications where improving turbine engine performance is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
a stationary assembly; and
a rotor assembly configured to rotate relative to said stationary assembly, said rotor assembly comprising:
a plurality of unitary turbine and fan blades formed as a unitary structure, wherein each unitary turbine and fan blade comprises a single turbine airfoil, a single fan airfoil positioned radially outward from said single turbine airfoil, and a midspan shroud segment extending between said single turbine airfoil and said single fan airfoil; and
a rotor disk formed unitarily with the plurality of unitary turbine and fan blades as a unitary structure,
wherein said single turbine airfoil is fabricated from a first material and said single fan airfoil is fabricated from a second material different from the first material, and wherein said midspan shroud segment is fabricated from a combination of the first material and the second material.

2. The turbine engine in accordance with claim 1, wherein said each unitary turbine and fan blade comprises at least one reinforcing support member extending through said single turbine airfoil, across said midspan shroud segment, and through said single fan airfoil.

3. The turbine engine in accordance with claim 2, wherein said at least one reinforcing support member extends longitudinally along thickest portions of said single turbine airfoil and said single fan airfoil.

4. The turbine engine in accordance with claim 2, wherein said at least one reinforcing support member comprises a first reinforcing support member and a second reinforcing support member, said first reinforcing support member extending longitudinally along leading edges of said single turbine airfoil and said single fan airfoil, and said second reinforcing support member extending longitudinally along trailing edges of said single turbine airfoil and said single fan airfoil.

5. A rotor assembly for use in a turbine engine, said rotor assembly comprising:
at least one unitary turbine and fan blade formed as a unitary structure comprising:
a single turbine airfoil;
a single fan airfoil;
a midspan shroud segment extending between said single turbine airfoil and said single fan airfoil; and
a rotor disk formed unitarily with the at least one unitary turbine and fan blade as a unitary structure,
wherein said single turbine airfoil is fabricated from a first material and said single fan airfoil is fabricated from a second material different from the first material, and wherein said midspan shroud segment is fabricated from a combination of the first material and the second material.

6. The rotor assembly in accordance with claim 5, wherein said at least one unitary turbine and fan blade comprises at least one reinforcing support member extending through said single turbine airfoil, across said midspan shroud segment, and through said single fan airfoil.

7. The rotor assembly in accordance with claim 6, wherein said at least one reinforcing support member extends longitudinally along thickest portions of said single turbine airfoil and said single fan airfoil.

8. The rotor assembly in accordance with claim 6, wherein said at least one reinforcing support member comprises a first reinforcing support member and a second reinforcing support member, said first reinforcing support member extending longitudinally along leading edges of said single turbine airfoil and said single fan airfoil, and said second reinforcing support member extending longitudinally along trailing edges of said single turbine airfoil and said single fan airfoil.

9. A method of assembling a turbine engine, said method comprising:

unitarily forming a plurality turbine and fan blades and a rotor disk together as a unitary structure, wherein each unitarily formed turbine and fan blade includes a single turbine airfoil fabricated from a first material, a single fan airfoil fabricated from a second material different than the first material, and a midspan shroud segment defined between the single turbine airfoil and the single fan airfoil, the midspan shroud segment fabricated from a combination of the first material and the second material; and orienting the plurality of unitarily formed turbine and fan blades such that the single fan airfoil is positioned radially outward from the single turbine airfoil.

10. The method in accordance with claim 9, wherein unitarily forming a plurality of turbine and fan blades and rotor disk together as a unitary structure comprises forming the plurality of unitary turbine and fan blades and the rotor disk in an additive manufacturing process.

11. The method in accordance with claim 9, further comprising orienting the plurality of unitarily formed turbine and fan blades such that each midspan shroud segment is radially aligned with each other.

* * * * *